June 14, 1955  I. L. HUDDON  2,710,517
WEED CUTTER ATTACHMENT FOR LAWN MOWER
Filed March 31, 1951.  2 Sheets-Sheet 1

INVENTOR.
Ivan L. Huddon
BY
Nathaniel Frucht
ATTORNEY

June 14, 1955     I. L. HUDDON     2,710,517
WEED CUTTER ATTACHMENT FOR LAWN MOWER
Filed March 31, 1951     2 Sheets-Sheet 2
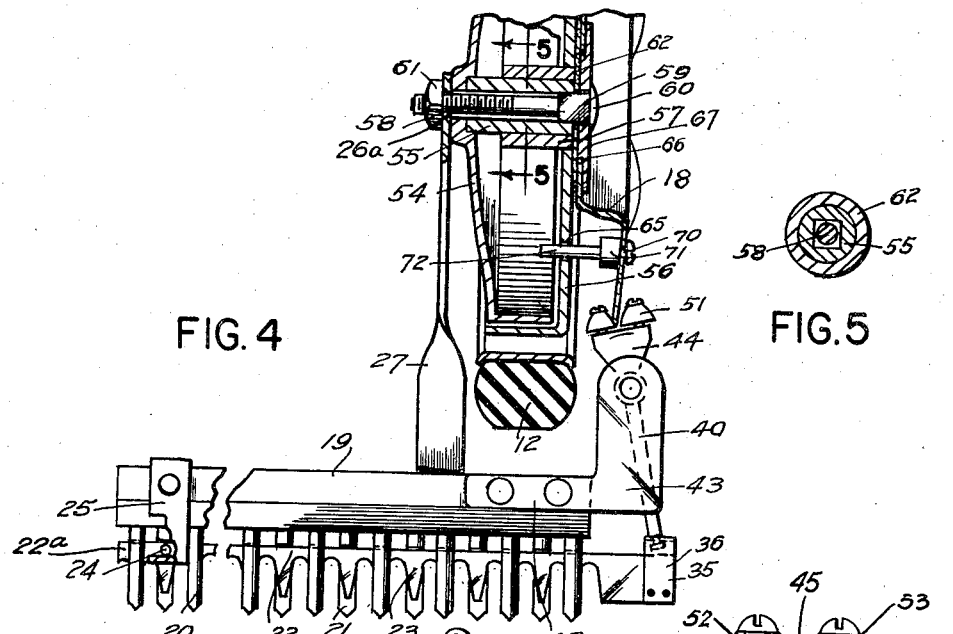
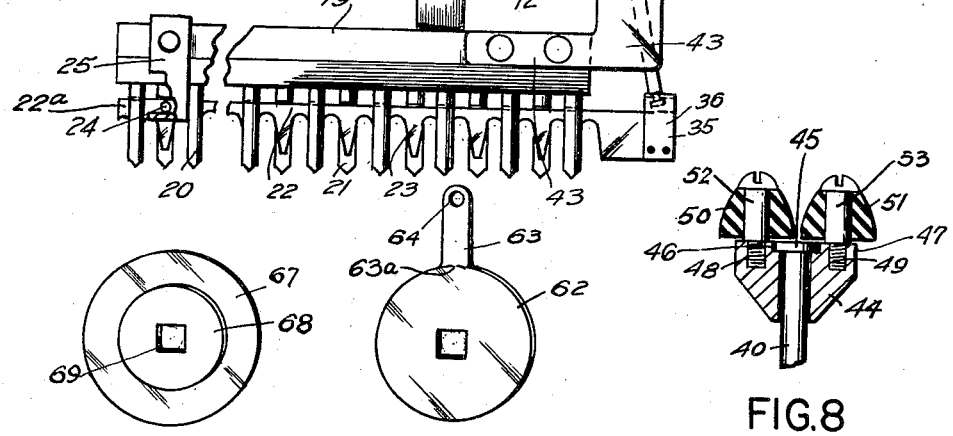
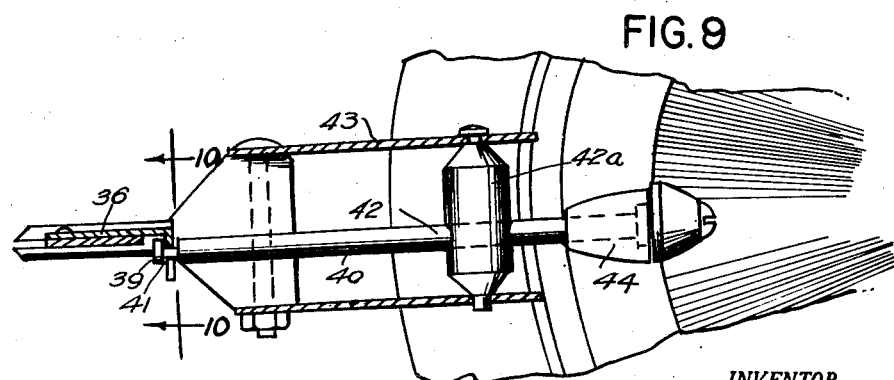
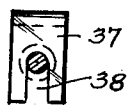
INVENTOR.
Ivan L. Huddon
BY
Nathaniel Frucht
ATTORNEY

United States Patent Office 2,710,517
Patented June 14, 1955

2,710,517

WEED CUTTER ATTACHMENT FOR LAWN MOWER

Ivan L. Huddon, Warren, R. I.

Application March 31, 1951, Serial No. 218,601

1 Claim. (Cl. 56—258)

The present invention relates to lawn mowers and has particular reference to an attachment which cuts weeds and the like.

The principal object of the invention is to provide a weed cutter which may be readily mounted on a lawn mower of the hand propelled or power type.

A further object of the invention is to provide a weed cutter attachment which includes a cam element secured to one of the lawn mower wheels, and actuated by rotation of the associated wheel.

Another object of the invention is to provide a weed cutter attachment which consists of a small number of readily manufactured and assembled parts.

With the above and other objects and advantageous features in view, the invention consists of a novel arrangement of parts more fully disclosed in the detailed description following, in conjunction with the accompanying drawings, and more specifically defined in the claim appended thereto.

Referring to the drawings,

Fig. 4 is a sectional detail of the weed cutter attachment and the associated lawn mower parts on the line 4—4 of Fig. 1;

Fig. 5 is a section on the line 5—5 of Fig. 4;

Fig. 6 is a perspective view of the cam support bearing;

Fig. 7 is a perspective view of the cam bearing washer blank;

Fig. 8 is an enlarged detail view, partly in section, of the cam actuated oscillator head;

Fig. 9 is an enlarged side view, partly in section, of the oscillator rod and its associated parts; and Fig. 10 is a detail view on the line 10—10 of Fig. 9.

Figure 1:
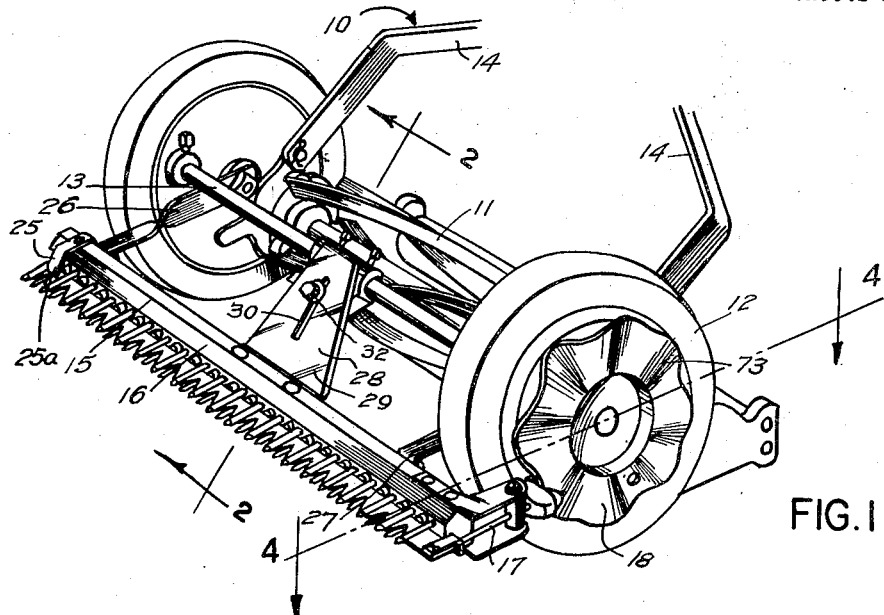
Fig. 1 is a perspective view of the lower portion of a lawn mower equipped with the novel weed cutter.

It has been found desirable to provide a weed cutter attachment which may be readily mounted on a hand or power type lawn mower, without need for the services of a mechanic or the like. To this end, I have devised a simple weed cutter blade mounting which is adjustably secured to the lawn mower cross rod and to the wheel shafts, and I have positioned an actuator cam on one wheel so that it turns with the wheel to actuate a swinging rod which is secured to one end of the weed cutter blade, whereby the normal movement of the lawn mower in cutting the grass will also reciprocate the weed cutter blade. I have further provided a novel arrangement for an actuator head for the swinging rod, so that friction of the weed cutter parts is small, and I have devised a cutter blade of special construction for cutting in both directions as it reciprocates, the cutter blade having double edged teeth and freely sliding between sets of fixed teeth so that tension is eliminated and the cutter blade teeth are self-sharpening.

Referring to the drawings, the lawn mower 10 is of conventional type, with grass cutting blades 11, wheels 12, cross-rod 13, and handle support arms 14. The weed cutter attachment 15 includes a cutter blade mounting 16, an actuating rod 17, and a cam 18 which is locked to one wheel 12.

The cutter blade mounting 16 includes an elongated holder 19, which may be of wood or of metal, having a series of spaced upper teeth 20 and a parallel series of spaced lower teeth 21, preferably formed by half milling round stock, a cutter blade 22 being slidably positioned between the upper and lower series of teeth, and having spaced triangular teeth 23 which are in cutting relation to both the upper and lower teeth 20 and 21. A pin 24 extends upwardly from the left end 22a of the cutter blade, and is slidably received behind the lower edge 25a of an overhanging lock strap 25, mounted on the holder 19.

Figures 2, 3:
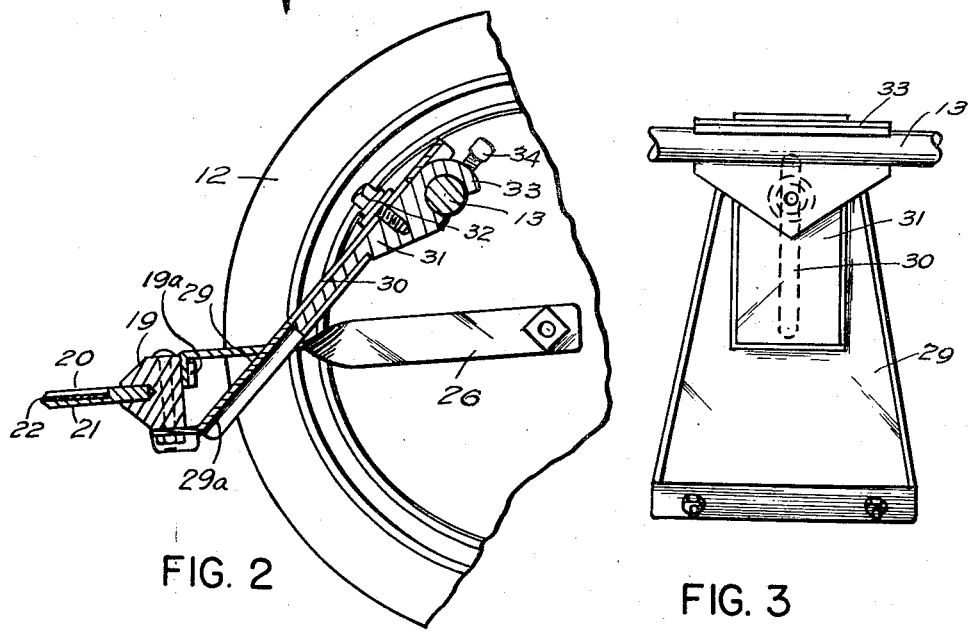
Fig. 2 is an enlarged section, partly broken away, on the line 2—2 of Fig. 1.
Fig. 3 is a rear projection of the adjustable holding bracket of Fig. 2.

The holder 19 is mounted on the lawn mower by means of two side bars 26, 27 which have their outer ends secured to the holder 19 by screws 19a or other suitable means and have their inner ends bored as indicated by the reference numeral 26a to seat over the wheel axle shafts, as illustrated; a central bearing 28 is also provided, comprising a plate 29 which has its lower end 29a secured to the holder 19, preferably centrally thereof, and has a vertical slot 30 for adjustably locking to a back plate 31, as by a screw 32, the back plate 31 having a hooked upper end 33, see Fig. 2, adapted to seat on the cross rod 13 and to be locked in place thereon by means of a lock screw 34.

Referring now to Figs. 4 to 10, the right end of the cutter blade has one leg 35 of a metal right angle strap 36 secured thereto in any suitable manner, the other leg 37 extending downwardly and having a vertical slot 38, see Fig. 10. The forward end 39 of an actuator rod 40 has an annular recess 41, as illustrated in Fig. 9, to be received in the slot 38, the rear end 42 of the rod 40 passing through a support 42a which is swingably mounted in a bracket frame 43 secured to and extending rearwardly of the holder 19.

An actuator head 44, see Fig. 8, is swivelly mounted on the forward end of the rod 40, which has an enlarged end 45 received in a recess 46 of a head base 47 which may be hollow, if desired, and is swivelly mounted on the rod 40, the assembly being accomplished by threading the base on the forward end 39 of the rod 40. The base 47 has two threaded recesses 48, 49, and two rollers 50, 51, preferably of flexible or resilient material, are rotatably mounted on shafts 52, 53 which has their lower ends reduced and threaded into the recesses 48, 49.

Referring now to Fig. 4, the lawn mower wheel 12 has a stationary inner support plate 54 with hub 55 on which the wheel disk 56 and the wheel hub 57 rotate. The wheel shaft bolt 58 has a square upper end 59 and a cap 60, the bolt 58 being of sufficient length to support the cam parts hereinafter described and the side bar 27, the parts being locked together by a nut 61.

The cam parts include an inner washer 62, which when blanked out has an upstanding finger 63 provided with a guide opening 64, the finger being scored as indicated by the reference numeral 63a and adapted to be snapped off. The washer blank is mounted on the bolt 58 and a hole 65 is drilled through the opening 64 and the wheel disk 56. The finger 63 is now snapped off, but may remain if desired. The cam disk 18 has a central opening 66, and a bearing washer 67 which has a stepped portion 68 for seating in the cam disk opening, and a square central opening 69, is seated on the square end 59 of the wheel shaft bolt 58.

The cam disk has an opening 70 and a depending threaded flange 71, whereby a screw headed pin 72 is threaded into the flange to seat in the wheel disk opening 65; the nut 61 is now tightened to lock the parts together, whereby the pin is turned as the wheel turns, to rotate the cam disk 18 on its bearing washer. The cam disk, see Fig. 1, is shaped to provide laterally extending curving surfaces 73 forming a serpentine cam edge, and its rim is positioned between the rollers 50, 51, whereby the rotation of the cam disk shifts the swinging actuator head to the right and left and thus reciprocates the cutter blade through the swinging actuator rod.

The invention thus includes a blade assembly which is secured to a lawn mower frame and consists of spaced parallel sets of teeth between which a toothed cutter blade is slidable, a cam disk which is secured to the wheel disk of one of the ground engaging wheels of the lawn mower and has laterally extending curved surfaces, and an operating rod which is secured to one end of the cutter blade and has a pivoted head mounted to contact the laterally extending surfaces of the cam disk and to be moved to and fro as the cam disk turns.

Although I have disclosed a specific constructional embodiment of the invention, it is obvious that changes in the size, shape and arrangement of the parts may be made to correspond to different styles and types of lawn mowers, without departing from the spirit or the scope of the invention as defined in the appended claim.

I claim:

A weed cutter attachment for lawn mowers having a frame and ground engaging wheels, comprising a disk having a serpentine cam edge and adapted to be mounted on one wheel, and an elongated cutter blade holder adapted to be secured to the lawn mower frame and having a series of spaced upper teeth and a parallel series of spaced lower teeth, a cutter blade slidably positioned in the holder and having triangular teeth in cutting relation to the upper and lower holder teeth, a strap secured to one end of the blade and having a depending leg, said leg having a slot, a bracket frame secured to the holder at said end, an actuator rod pivotally mounted intermediate its ends in the bracket frame, one end of the rod being seated in the slot, and an actuator head having spaced rollers swivelly mounted on the other end of the rod and adapted to receive the serpentine cam disk edge therebetween, whereby the cutter blade is adapted to be reciprocated on rotation of the disk.

References Cited in the file of this patent

UNITED STATES PATENTS

| Number | Name | Date |
| --- | --- | --- |
| Re. 23,269 | Haefner | Sept. 19, 1950 |
| 13,438 | Russell | Aug. 14, 1855 |
| 146,161 | Beach | Jan. 6, 1874 |
| 1,165,169 | Hawkins | Dec. 21, 1915 |
| 1,594,244 | Daniels | July 27, 1926 |
| 1,617,045 | Darling | Feb. 8, 1927 |
| 1,913,094 | Smath et al. | June 6, 1933 |
| 2,044,159 | Durst | June 16, 1936 |